US012016269B2

(12) United States Patent
Robertson

(10) Patent No.: US 12,016,269 B2
(45) Date of Patent: *Jun. 25, 2024

(54) CONCAVE COVER PLATE SYSTEM AND METHODS

(71) Applicant: Brian Robertson, Dallas, TX (US)

(72) Inventor: Brian Robertson, Dallas, TX (US)

(*) Notice: Subject to any disclaimer, the term of this patent is extended or adjusted under 35 U.S.C. 154(b) by 365 days.

This patent is subject to a terminal disclaimer.

(21) Appl. No.: 17/393,290

(22) Filed: Aug. 3, 2021

(65) Prior Publication Data
US 2021/0360860 A1  Nov. 25, 2021

Related U.S. Application Data

(63) Continuation of application No. 16/129,432, filed on Sep. 12, 2018, now Pat. No. 11,116,136, which is a continuation-in-part of application No. 16/050,714, filed on Jul. 31, 2018, now Pat. No. 10,869,427, which is a continuation of application No. 15/832,142, filed on Dec. 5, 2017, now Pat. No. 10,045,487.

(51) Int. Cl.
A01F 12/26 (2006.01)
A01F 7/06 (2006.01)
A01F 12/18 (2006.01)
A01F 12/28 (2006.01)

(52) U.S. Cl.
CPC .............. A01F 12/26 (2013.01); A01F 7/067 (2013.01); A01F 12/185 (2013.01); A01F 12/28 (2013.01)

(58) Field of Classification Search
CPC ........ A01F 12/26; A01F 12/28; A01F 12/185; A01F 7/067; B07B 1/185; B07B 1/20
See application file for complete search history.

(56) References Cited

U.S. PATENT DOCUMENTS

| | | | |
|---|---|---|---|
| 2,159,664 A | 5/1939 | Lindgren | |
| 2,305,964 A | 12/1942 | Harrison et al. | |
| 2,833,288 A | 12/1953 | Scranton | |
| 2,686,523 A | 8/1954 | Young | |
| 3,092,115 A | 6/1963 | Morgan | |
| 3,191,607 A | 6/1965 | Baumeister et al. | |
| 3,439,684 A | 4/1969 | Davidow et al. | |
| 3,537,459 A | 11/1970 | Thomas | |
| 3,568,682 A | 3/1971 | Knapp et al. | |
| 3,696,815 A | 10/1972 | Rowland-Hill et al. | |
| 3,762,982 A | 10/1973 | Whittington | |
| 4,004,404 A * | 1/1977 | Rowland-Hill | A01F 12/24 460/110 |
| 4,105,220 A | 8/1978 | Doyle | |
| 4,138,132 A | 2/1979 | Doyle | |
| 4,495,954 A | 1/1985 | Yarbrough | |

(Continued)

FOREIGN PATENT DOCUMENTS

| | | | |
|---|---|---|---|
| BR | 102015006974 A2 | 12/2016 | |
| DE | 19525244 A1 * | 1/1997 | ............. A01F 12/42 |

(Continued)

Primary Examiner — Alicia Torres
(74) Attorney, Agent, or Firm — Jeffrey G. Degenfelder; Carstens, Allen & Gourley, LLP

(57) ABSTRACT

A removable cover plate assembly may be quickly attached, detached and adjusted to the exterior of a concave grate of a combine harvester in order to adjust the flow characteristics of the concave or separator grate assemblies.

20 Claims, 14 Drawing Sheets

(56) References Cited

U.S. PATENT DOCUMENTS

| | | |
|---|---|---|
| 4,499,908 A | 2/1985 | Niehaus |
| D298,802 S | 12/1988 | Tekirian |
| 4,875,891 A | 10/1989 | Turner et al. |
| D313,774 S | 1/1991 | Hauer |
| 5,024,631 A | 6/1991 | Heidjann et al. |
| 5,183,281 A | 2/1993 | Stephens |
| D341,343 S | 11/1993 | Netz |
| 5,397,146 A | 3/1995 | Fischer |
| 5,489,239 A | 2/1996 | Matousek et al. |
| 5,569,080 A | 10/1996 | Estes |
| 5,613,907 A | 3/1997 | Harden |
| 6,074,297 A | 6/2000 | Kuchar |
| 6,193,604 B1 | 2/2001 | Ramp et al. |
| 6,419,039 B1 | 7/2002 | Wagner |
| D491,112 S | 6/2004 | Francis et al. |
| 6,802,771 B2 | 10/2004 | Schwersmann et al. |
| 6,932,697 B2 | 8/2005 | Baumgarten et al. |
| 7,144,030 B2 | 12/2006 | Buell et al. |
| D560,764 S | 1/2008 | Gibb et al. |
| D587,347 S | 2/2009 | Madara et al. |
| D598,077 S | 8/2009 | Gibb et al. |
| D600,326 S | 9/2009 | Gibb et al. |
| 7,637,520 B2 | 12/2009 | Madden |
| 8,636,568 B1 | 1/2014 | Farley |
| 8,690,652 B1 | 4/2014 | Estes |
| 9,155,249 B2 | 10/2015 | Baumgarten et al. |
| D742,213 S | 11/2015 | Sasanecki |
| 9,215,845 B2 | 12/2015 | Regier |
| 10,045,487 B1 | 8/2018 | Robertson |
| 10,143,141 B2 * | 12/2018 | De Witte .............. A01F 12/446 |
| 10,412,895 B2 | 9/2019 | Theisen et al. |
| 10,779,474 B2 * | 9/2020 | Ritter ..................... A01F 12/26 |
| 2006/0128452 A1 | 6/2006 | Esken |
| 2012/0091686 A1 | 4/2012 | Hutchinson |
| 2014/0087793 A1 | 3/2014 | Regier |
| 2016/0345499 A1 | 12/2016 | Van Hullebusch |
| 2017/0105351 A1 | 4/2017 | Matway et al. |
| 2018/0084728 A1 | 3/2018 | Regier |
| 2018/0103588 A1 | 4/2018 | Ritter |

FOREIGN PATENT DOCUMENTS

| | | | |
|---|---|---|---|
| DE | 202017102477 U1 * | 7/2017 | ............ A01F 12/24 |
| DE | 102017108967 A1 | 10/2018 | |
| EP | 1059023 B1 * | 8/2004 | ............ A01F 12/26 |
| EP | 3097767 A1 | 11/2016 | |
| FR | 2621216 B1 | 8/1990 | |
| JP | H06276839 A | 10/1994 | |
| JP | H0851854 A | 2/1996 | |
| WO | WO0124609 A1 | 4/2001 | |
| WO | WO 2018185035 A1 | 10/2018 | |

* cited by examiner

CONCAVE COVER PLATE SYSTEM AND METHODS

1. CROSS-REFERENCE TO RELATED APPLICATION

This application is a continuation application of U.S. patent application Ser. No. 16/129,432 filed Sep. 12, 2018, which is a continuation-in-part application of U.S. patent application Ser. No. 16/050,714 filed Jul. 31, 2018, which is a continuation application of U.S. patent application Ser. No. 15/832,142 filed Dec. 5, 2017, the technical disclosure of which is hereby incorporated herein by reference.

BACKGROUND OF THE INVENTION

2. Technical Field of the Invention

This invention relates to agricultural harvesting machines of the type that use rotary processing devices, and particularly to a threshing mechanism in which a rotary threshing cylinder cooperates with concave threshing and separator grates with openings, and more particularly with a means for at least partially closing the concave grates by the attachment of one or more cover plates to provide maximum harvesting versatility.

3. Description of the Related Art

An agricultural harvester, most commonly known as a combine harvester, is a vehicle used for the harvesting of agricultural crops. Prior art combine harvesters are typically composed of several systems to pick, thresh, separate, clean and retain the grain from the particular crop being harvested. For example, in one type of prior art combine harvester's threshing system, the crop travels axially parallel to and helically around the rotational axis of one or more rotary processing devices commonly referred to as rotors. In other prior art combine harvester's threshing systems, during at least a portion of its travel through the system, the crop travels in a transverse or tangential direction relative to the rotational axis of a rotary processing device commonly referred to as a threshing cylinder. In each of the prior art threshing systems, crop material is processed between rasp elements attached to the periphery of a rotary device and arcuate grates, usually foraminous, stationary threshing concaves and separating grates that at least partially wrap around the rotor. The typical threshing concave used with a rasp bar threshing cylinder consists essentially of an arcuate grate, roughly concentric with the threshing cylinder. The crop material travels around the rotary cylinder and is "wedged" in between the rotary cylinder and threshing concaves causing the grain to be removed from the stalk.

For example, Regier (U.S. Pat. No. 9,215,845) discloses an exemplary prior art combine harvester. As shown in FIG. 1, the depicted combine harvester 10 has a single axial flow rotary processing system 12 that extends generally parallel with the path of travel of the machine. However, as will be seen, the principles of the present invention are not limited to combine harvesters having only a single axial flow rotary processing system. For the sake of simplicity in explaining the principles of the present invention, this specification will proceed utilizing a combine harvester having a single axial flow processing system as the primary example.

The exemplary prior art combine harvester 10 depicted in the illustrated embodiment includes a harvesting header (not shown) at the front of the machine that picks or cuts the harvested crop and delivers the collected crop material to the front end of a feeder house 14. A conveyor 16 moves the crop material rearwardly within the feeder house 14 until reaching the processing system 12. With reference now to FIG. 2, the illustrated embodiment the exemplary prior art processing system 12 has a rotor 20 having an infeed auger 22 on the front end thereof. The auger 22 and rotor 20 advance the crop material axially through the processing system 12 for threshing and separating. The rotor 20 typically includes a plurality of rasp-like elements 55, configured about the rotor's peripheral surface. The rotor is partially encased by a series of threshing concave grate assemblies 24 and separator grate assemblies 26. As the crop material moves around and in-between the rasp-like elements 55 and the threshing concave grate assemblies 24, the crop is threshed. Any free grain, that has been threshed, falls through openings in the concave grate assemblies 24, 26 and is retained by the combine harvester. In other types of processing systems, a conveyor 16 may deliver the crop material directly to a threshing cylinder.

Generally speaking, the crop material entering the processing system 12 moves axially and helically through the system during threshing and separating. During such travel the crop material is threshed and separated by rotor 20 operating in cooperation with preferably concave foraminous separator 23 in comprising at least one threshing concave grate assembly 24 and a concave separator grate assembly 26, with the grain escaping laterally through threshing concave grate assemblies 24 and concave separator grate assemblies 26 into a cleaning mechanism 28 (FIG. 1). Bulkier stalk and leaf material is retained by the threshing concave grate assemblies 24 and separator grate assemblies 26 and ejected out of the processing system 12 at the rear of the combine harvester 10. The cleaning mechanism 28 may further include a blower (not shown), which provides a stream of air directed throughout the cleaning region below processing system 12 and out the rear of the harvester 10 so as to carry lighter chaff particles away from the grain as it migrates downwardly toward the bottom of the machine to a clean grain auger 30. The auger 30 delivers the clean grain to an elevator (not shown) that transfers the grain to a storage bin 34 on top of the machine, from which it is ultimately unloaded via an unloading spout 36.

A plurality of threshing concave grate assemblies 24 and concave separator grate assemblies 26 are arranged side-by-side axially along the processing system 12 to form a part of what may be considered a tubular housing 38 that concentrically receives rotor 20 and serves as part of processing system 12. In the illustrated embodiment, three threshing concave grate assemblies 24 and three concave separator grates assemblies 26 form part of the tubular housing 38. However, it is understood that more or fewer threshing concave grate assemblies 24 and concave separator grate assemblies 26 may be used in the tubular housing 38. As is known in the art, the tubular housing 38 includes a convex top wall (not shown) that extends the full length of housing 38 and effectively closes off the top portion thereof from front to rear. The threshing concave grate assemblies 24 and concave separator grate assemblies 26 are moved adjustably toward and away from rotor 20 to adjust the running clearance between the rotor 20 and concave and separator grate assemblies 24, 26 and to change the shape of the threshing and separating regions as is known in the art and need to be further discussed herein.

As best seen in FIG. 3A, each threshing concave grate assembly 24 typically includes an arcuate first grate 40 and an arcuate second grate 42 pivotally mounted in the processing system 12. A suitable actuator (not shown) is located near the processing system 12 and mounted on portions of the combine harvester frame structure. Preferably, the actuator is remotely operable, such as from the cab of harvester 10. Grates 40 and 42 of each threshing concave grate assembly 24 desirably have substantially similar structure but mirror images, so only grate 40 will be described in detail herein. Additionally, the invention is described herein with respect to a grate of the threshing concave grate assembly 24, but one skilled in the art will understand that the invention may also be used with a concave separator grate assembly 26 without departing from the scope of the invention.

As shown in FIG. 3B, a conventional prior art threshing concave grate 40 typically includes a pair of arcuate, elongated and laterally spaced apart side rails 44 oriented generally transverse to the axis of the rotor 20. One end of each side rail 44 has a hook element 46 used to mount the threshing concave grate assembly 24 on an axial bar (not shown) used to move the threshing concave grate 24 toward or away from the rotor 20 (FIG. 2). A plurality of axial bars 48 spaced at predetermined intervals span the side rails 44. End plates 49 are preferably affixed between ends of the side rails 44. The axial bars 48 typically have outwardly projecting overhangs 50 at their opposite ends that overlay upper edges of the side rails 44 and are operable to bear against the same when grate 40 is installed. Preferably, the overhangs 50 are received in notches 52 in the upper edges of side rails 44 and welded to the side rails 44. Overhangs 50 also provide a substantially continuous surface when multiple grate assemblies 26 are installed side-by-side in the harvester 10. One or more middle supports 51 are typically positioned between and parallel to the side rails 44 and support the axial bars 48.

Each threshing concave grate 40 is customized for a particular crop type by varying the size, number, shape and spacing of the axial bars 48. The various threshing concave grates 40 are typically swapped out depending upon the crop being harvested. While the plurality of axial bars 48 shown in the figures are depicted as having a generally round cross-section with a partially flattened top or interior surface, it is understood that the axial bars cross section may alternatively be completely round, notched, oval, square or polygonal.

Conventional combine harvesters are utilized to harvest a wide variety of different crops. Farmers generally harvest several crops each year and crop rotation is a standard agricultural practice. However, some crops are easier to thresh (i.e., separate grain or seed from chaff) than others. The threshing concave grates are typically customized for the type of crop being harvested. For example, sunflower seeds can be harvested with a simple shake of the stem of the plant, whereas some varieties of wheat must be vigorously rubbed together for many seconds for the seeds to separate from the chaff. For some crops and operations, it is desirable for the lateral spacing between adjacent axial bars 48 of a threshing concave grate 40 to be very narrow in order to modify the threshing and separating action. The threshing concave grates 40 for harder to thresh grains typically have axial rods 48 that are spaced close together and restrict airflow through the concave so that the material remains in the threshing section longer and hence is more fully threshed by the time it gets to the separation concave grating whose purpose is to capture the threshed grain. However, threshing concave grates 40 are heavy and their installation is time consuming and costly during harvest season. Thus, it is oftentimes desirable to adjust the flow of crop material over the threshing concave grates and separator grates to give the rotor more opportunity to thresh and separate the crop material.

While the basic design of the conventional rasp bar cylinder and threshing concave is long practiced, numerous patents directed at means for modifying the characteristics of the threshing concave grates, including devices and methods for closing or partially closing openings in the concave grate, continue to appear. However, prior art solutions to closing or partially closing threshing concave grates have oftentimes been cumbersome in application and inefficient in flexibility of use. For example, Lindgren (U.S. Pat. No. 2,159,664) discloses using multiple insert filler plates configured between adjacent grate bars to adjust the flow characteristics of a threshing machine. However, the Lindgren invention requires the modification of side bars of the concave (adding pins to help retain the filler strip) and relies on a fastening means which requires access from both the inner and outer sides of the concave. However, swapping out or even adjusting threshing concave grates in the field is a laborious task and often requires two or three people several hours to remove or adjust because of their size, weight and tight compartment constraints.

Young (U.S. Pat. No. 2,686,523), Morgan (U.S. Pat. No. 3,092,115), Baumeister et al. (U.S. Pat. No. 3,191,607) and Davidow et al (U.S. Pat. No. 3,439,684) all disclose systems of multiple filler strips attached to the inside of the threshing concave grates between the axial bars traversing the side rails. Although these systems are effective, they are cumbersome to attach and adjust to a threshing concave grate, and susceptible, in some operating conditions, to becoming detached resulting in the filler strip or components thereof being sucked into the downstream material flow, possibly with some damage to combine components. Furthermore, yet again, one must remove the concave grate assembly to access the inner portion of the threshing concave grate to attach the filler plate, which is simply not practical, especially during time-sensitive harvest season.

Yarbrough (U.S. Pat. No. 4,495,954) discloses a system of filler strip assembly attached to the inside of the threshing concave grate with mechanical screw fasteners. However, the filler strip assembly covers up the threshing elements of the threshing concave grate eliminating any threshing action by threshing concave grate. Moreover, the disclosed filler strips are solid and without openings so none of the resulting grain can readily escape and be captured.

A need, therefore, exists for an improved and more comprehensive mechanism for readily closing or partially closing the opening in a concave or separator grate assembly so as to modify its threshing and separating action. Moreover, a need exists for an improved and more comprehensive mechanism for closing or partially closing the opening in a concave or separator grate assembly that may be readily installed and adjusted in the field.

SUMMARY OF THE INVENTION

The present invention overcomes many of the disadvantages of changing the flow characteristics of prior art combine harvester's concave and separator grate assemblies by providing a removable cover plate assembly, which may be quickly attached, detached and adjusted to the exterior of a threshing concave grate in order to adjust the flow characteristics of the concave or separator grate assemblies. While the invention is described herein with respect to a grate of the threshing concave grate assembly, one skilled in the art will understand that the invention may also be used for the separator grate assembly without departing from the scope of the invention.

The cover plate assembly of the present invention improves the threshing capability of the rasp bar threshing cylinder while simultaneously capturing additional threshed grain. Moreover, the cover plate assembly of the present invention enables a single set of threshing concave grate assemblies to better harvest a wider variety of crop types.

The cover plate assembly comprises an elongated plate body dimensioned to be positioned between two parallel arcuate rails of a threshing concave grate assembly. For example, a preferred embodiment of the cover plate assembly of present invention includes an elongated plate body dimensioned to be positioned between an arcuate side rail and middle support rail of a threshing concave grate assembly. The cover plate assembly is designed to be configured in a curved supinated position against the plurality of axial bars or rods on the exterior of the threshing concave grate assembly. The opposing ends of the cover plate assembly are secured to the axial bars or rods by means of hooking clasp elements formed in the opposing ends of the cover plate. The hooking clasp elements have a dimensional shape that is complementary to the cross-sectional shape of the axial bars or rods, such that they can be easily and quickly attached and slidably locked in place by a simple tug along the longitudinal axis of the cover plate.

The cover plate assembly further includes a latching mechanism that maintains the lateral position of the cover plate so that the hooking clasp elements stay locked about their respective axial bars. For example, in a preferred embodiment the latching mechanism comprises a turn-buckle tension device configured between an anchor device secured to an end plate of the threshing concave grate assembly and an anchor bracket attached to the exterior-facing side of the cover plate. In another embodiment, the latching mechanism comprises a tension draw latch assembly. Indeed, one skilled in the art will understand that a wide variety of latching mechanisms can be employed to apply a tension force between the anchor bracket attached to the cover plate elongated body and the anchor device secured to an end plate of the threshing concave grate assembly.

In another preferred embodiment, the latching mechanism may comprise a turn-buckle tension device configured between an anchor device secured to a side rail of the concave grate assembly and an anchor bracket attached to the exterior-facing side of the cover plate. Alternatively, the anchor device may be secured to a bar extending between the opposing side rails of the concave grate assembly. The anchor bracket may rigidly attached (e.g., welded) or pivotally attached (e.g., by means of a pivoting rivet assembly) to the exterior-facing side of the cover plate.

In yet another alternative embodiment, the cover plate of the present invention may include one or more side latching mechanisms that maintain the lateral position of the cover plate within the side rails so that the hooking clasp elements stay locked about their respective axial bars. The side latching mechanisms may be used as an alternative to or in addition to the previously disclosed end latching devices. For example, in a preferred embodiment the side latching mechanism may comprise a sliding bolt latch mechanism attached to the cover plate and configured to engage a hole drilled in the side rail of the concave grate assembly. In another embodiment, the side latching mechanism may comprise a tension draw latch assembly configured to engage a latch catch attached to or formed into the side rail of the concave grate assembly. Indeed, one skilled in the art will understand that a wide variety of side latching mechanisms can be employed to secure the configuration of the cover plate on the concave grate assembly.

The cover plate may also include one or more accessory brackets attached to the exterior-facing side of the cover plate to assist the user in properly positioning and initially securing of the cover plate to a threshing concave grate assembly.

When properly installed, the elongated body of the cover plate assembly is pulled tightly against the back of the exterior side of the threshing concave grate assembly significantly changing airflow characteristics through the concave openings and consequently creating a cushion of air between concave and the cylinder of the combine. This cushion of air regulates the rate at which the crop material moves through the concave section. By restricting the airflow through a threshing concave grate assembly the time in which the crop is in the threshing section of the concave is prolonged which facilitates more material-on-material rubbing contact, thereby greatly improving threshing and separation of grain from chaff for hard-to-thresh crop types and varieties.

The elongated body of the cover plate assembly is preferably constructed of a single plate of high strength material such as metal, high strength plastics or composite fabric material. While a preferred embodiment of the cover plate assembly is constructed of steel plating that is permanently bent in an arcuate shape matching the exterior arcuate shape of a threshing concave grate assembly, it is understood that the elongated body of the cover plate assembly may be constructed of flexible, high strength materials such as stainless steel or woven composite materials. Alternatively, the elongated body can also be cast into a predetermined arcuate shape. In addition, while a preferred embodiment of the cover plate assembly features an elongated body having a unitary construction, wherein the hooking clasp elements on opposing ends of the assembly are simply formed into the ends of the elongated body, it is understood that the elongated body, and the two hooking clasp elements may comprise individual parts of a composite construction wherein the elongated body and the two hooking clasp elements are constructed of different materials. For example, the elongated body may be constructed of a woven plastic material, while the hooking clasp elements may be constructed of metal that are attached to the elongated body.

Moreover, the material used to construct the elongated body of the cover plate assembly may also have a wide variance of porosity and permeability. This may be accomplished by a variety of techniques. While a preferred embodiment of the cover plate assembly is constructed of solid plate material, other embodiments include a plurality of apertures or holes formed in the elongated body. The holes may be randomly placed or formed in a geometric pattern. The holes increase the airflow through the threshing concave grate assembly and provides an exit route for threshed grain from to be unloaded and captured so that the separation grate is not overloaded. In addition, the plurality of apertures or holes may further include means for adjusting the shape or size of the aperture.

For example, in one embodiment, such adjusting means may simply comprise a plug device for plugging the aperture. Alternatively, the adjusting means may comprise a sliding panel mechanism incorporated into the elongated body that features movable panel sections which could be positioned to close or partially close a hole or aperture.

The material that the elongated body is constructed of may also have a natural porosity and permeability. For example, the elongated body of the cover plate may be constructed of a metal mesh or composite material having organic porosity and permeability characteristics.

The longitudinal length of the elongated body of the cover plate assembly may also be varied to change the characteristics of the threshing concave grate. While a preferred embodiment of the invention is suitably dimensioned to substantially cover the entire lateral circumference of a threshing concave grate assembly, other embodiments may include elongated bodies having lesser longitudinal lengths so as to cover only a portion of the lateral circumference of a threshing concave grate assembly.

Finally, a preferred embodiment of the cover plate assembly of the present invention includes an elongated body having an adjustable width. The elongated body is comprised of two elongated plates attached in a slidably adjustable configuration for adjusting the lateral dimension or width of the cover plate assembly. In one embodiment, the two elongated plates are attached by means of a plurality of bolts attached to one plate and captured in slots formed in a second plate.

BRIEF DESCRIPTION OF THE DRAWINGS

A more complete understanding of the method and apparatus of the present invention may be had by reference to the following detailed description when taken in conjunction with the accompanying drawings, wherein.

Figure 1:
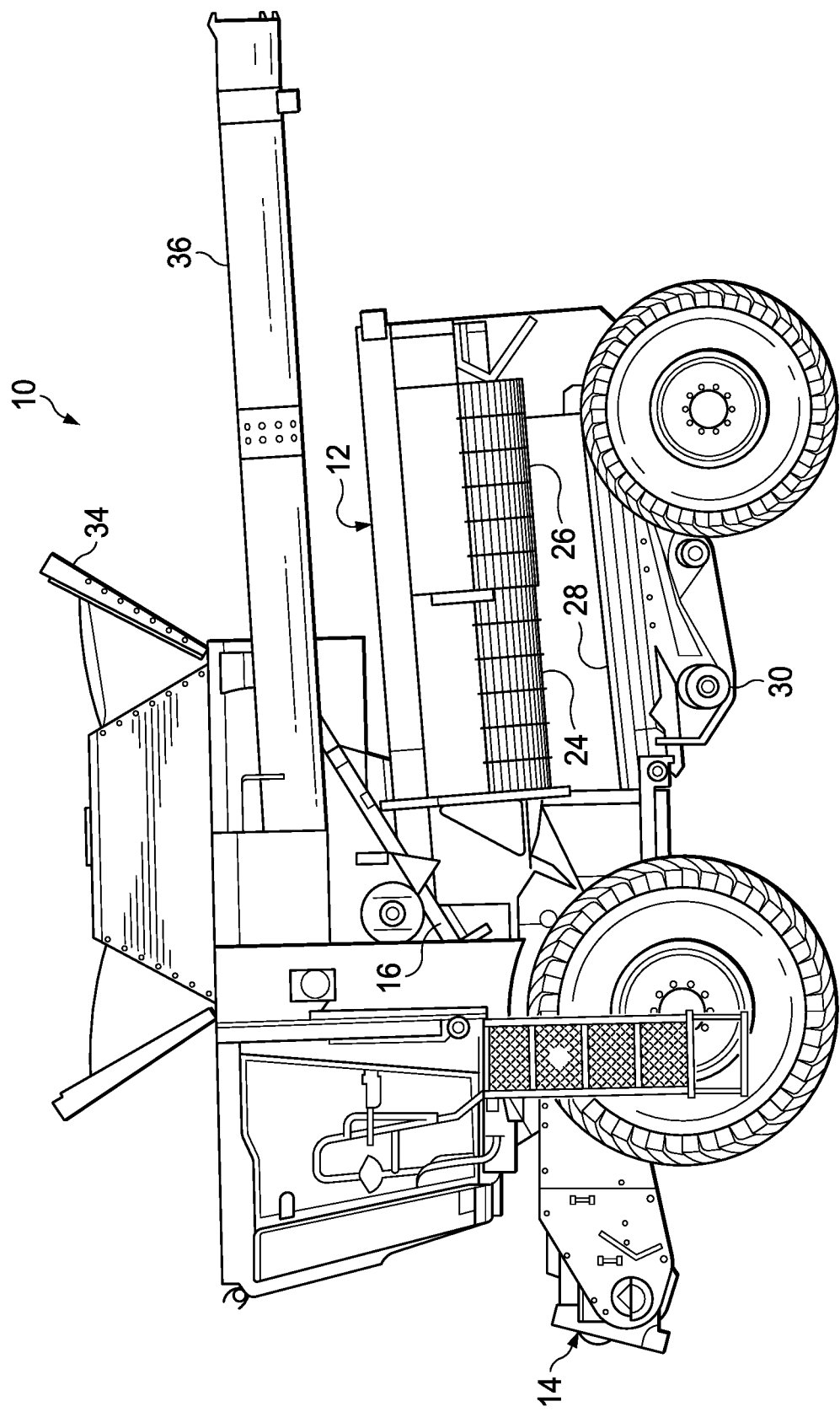
FIG. 1 is a schematic side elevational view of a prior art combine harvester having a processing system utilizing axial flow, portions of the harvester being broken away to reveal internal details of construction.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 4A:
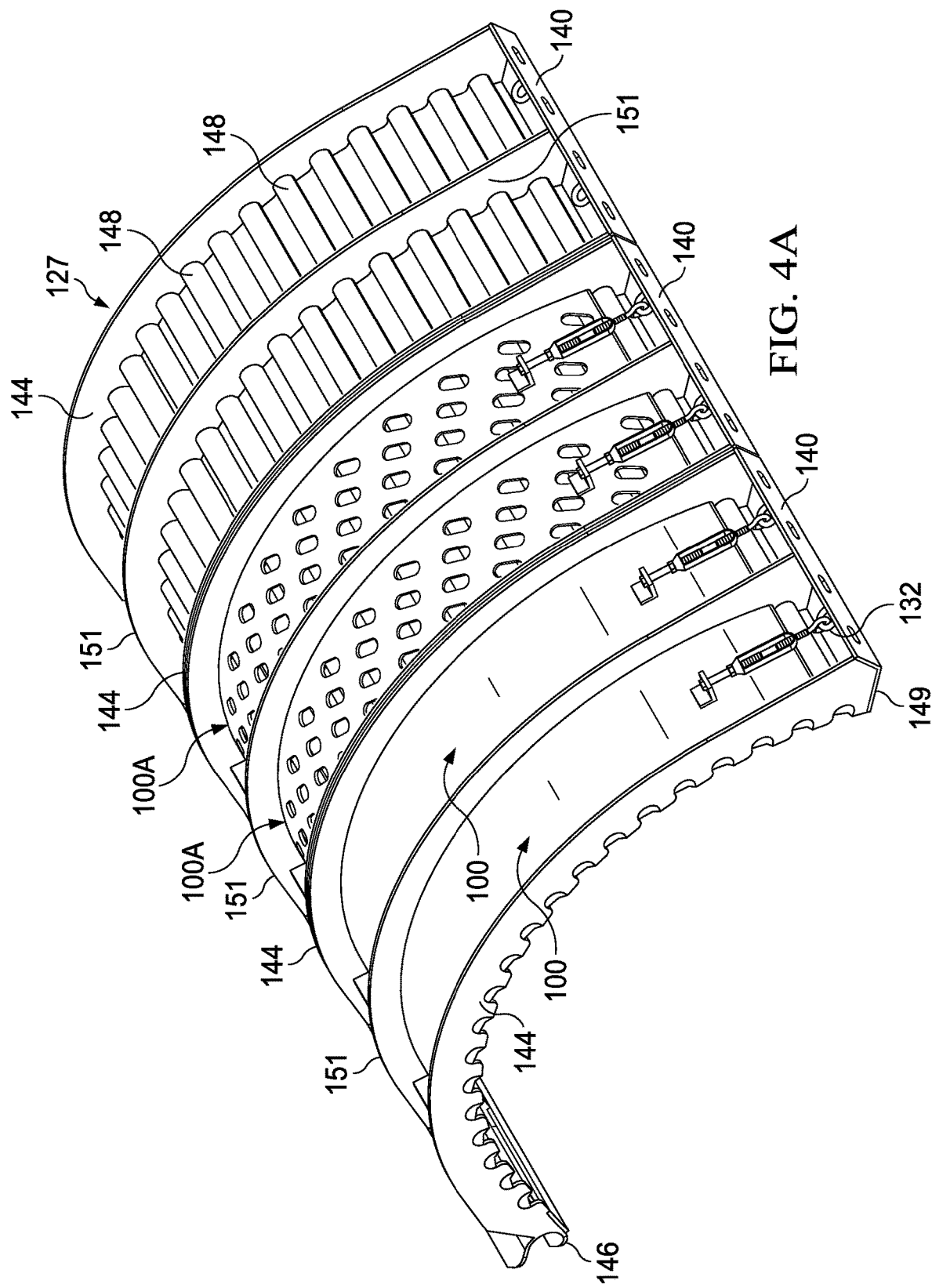
FIG. 4A is an isometric view of a multiple threshing concave grates incorporating embodiments of the cover plate assembly of the present invention.
Figure 4B:
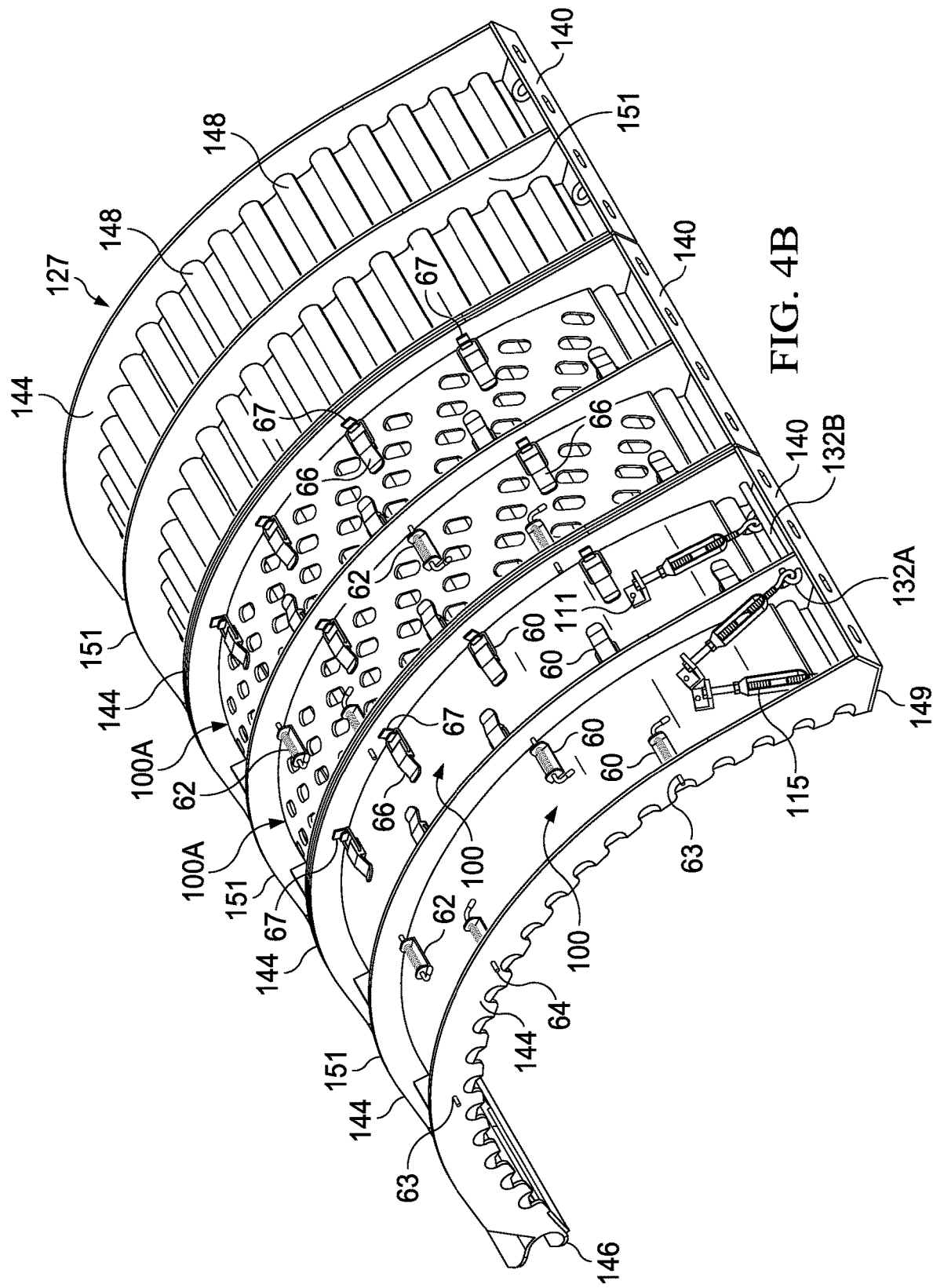
FIG. 4B is an isometric view of a multiple threshing concave grates incorporating alternative embodiments of the cover plate assembly of the present invention.

Turning now to the Figures, and in particular FIGS. 4A and 4B, multiple embodiments of the cover plate assembly of the present invention are shown attached to conventional threshing concave grates 140. While the invention is described herein with respect to a grate of the threshing concave grate assembly, one skilled in the art will understand that the invention may also be used for the separator grate assembly without departing from the scope of the invention.

Figure 2:
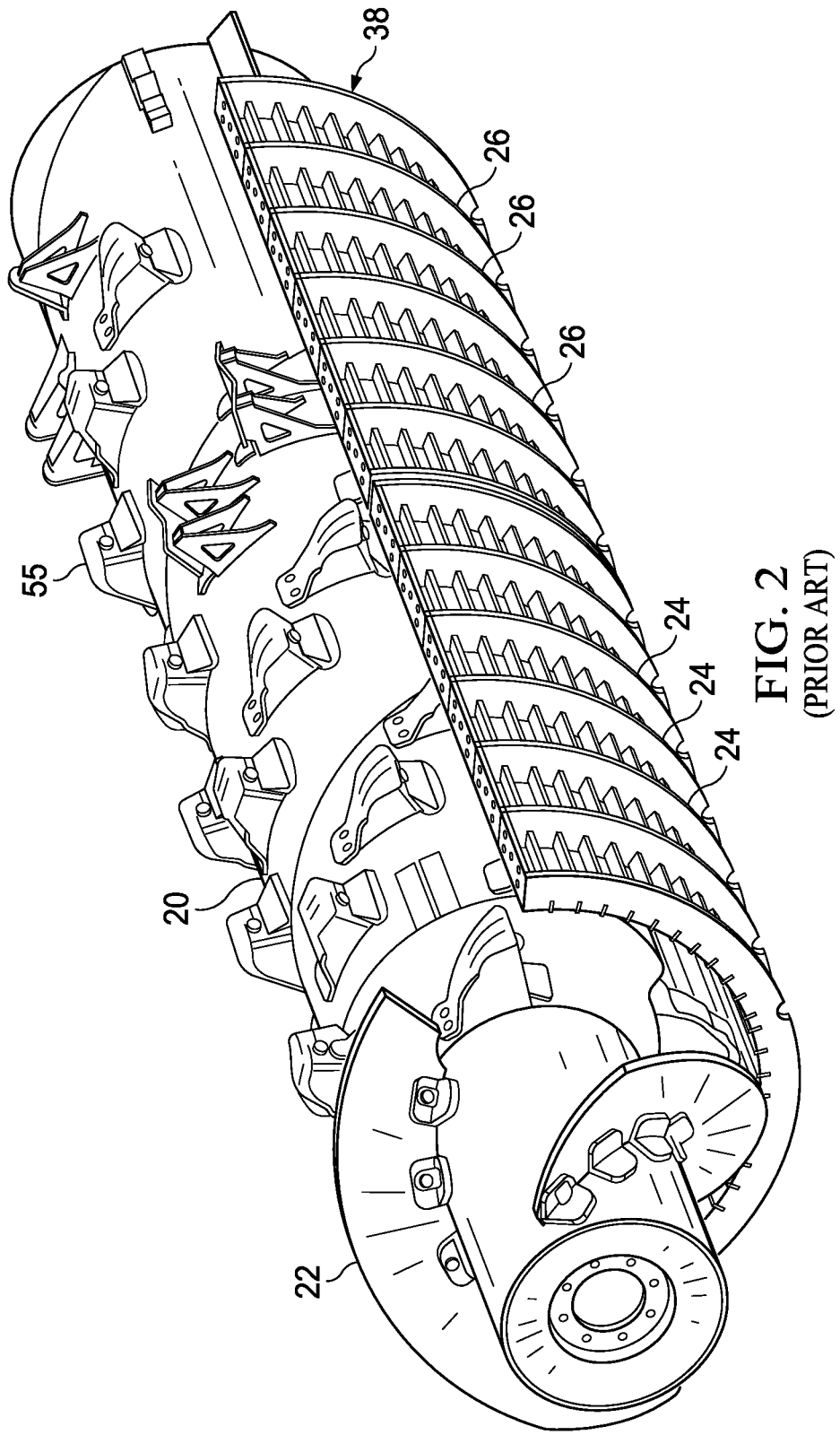
FIG. 2 is an enlarged isometric view of the prior art processing system within the prior art harvester of FIG. 1.
Figure 3A:
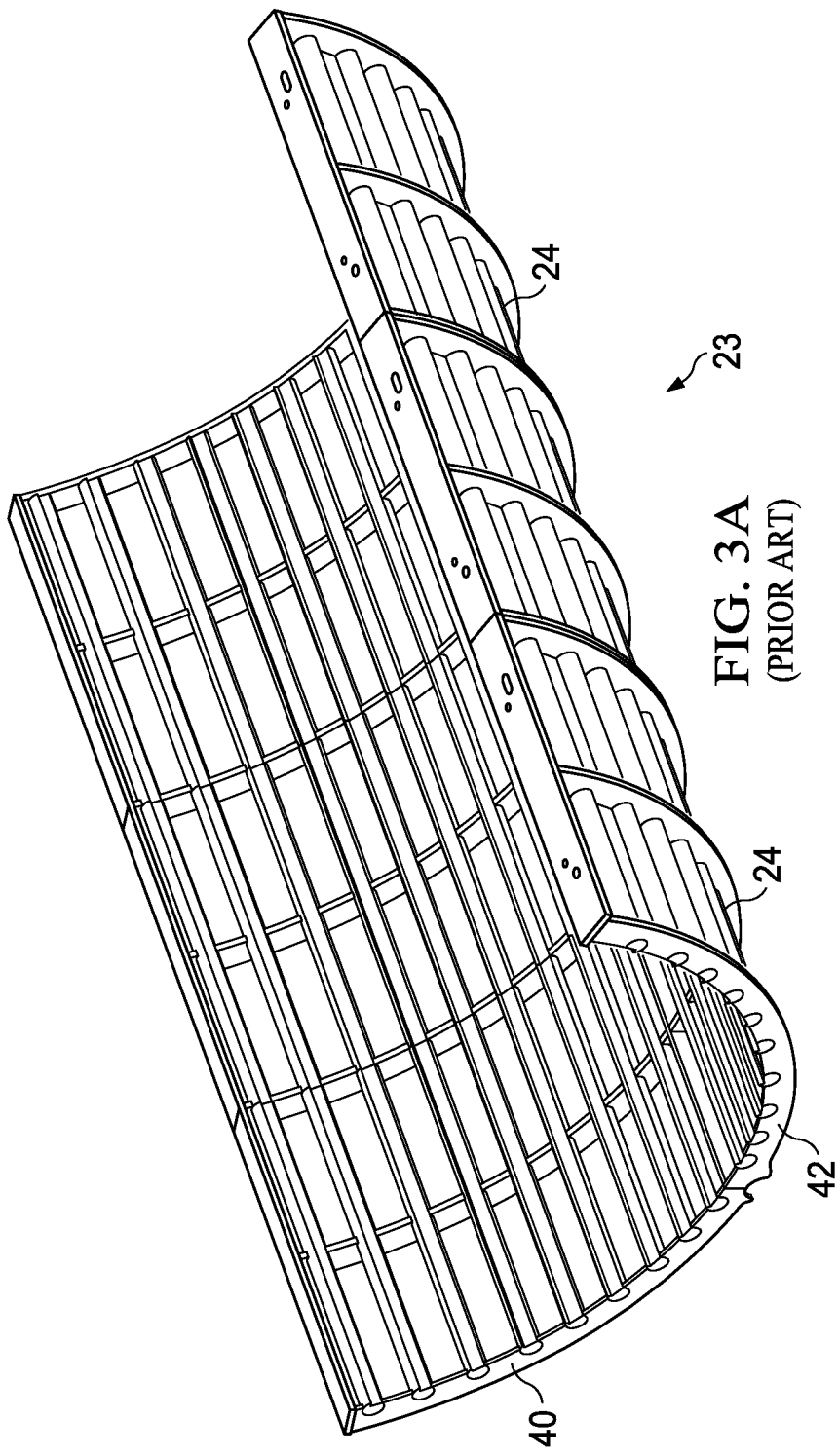
FIG. 3A is an enlarged isometric view of a portion of the prior art processing system of FIG. 2 showing threshing concave grate assemblies.
Figure 3B:
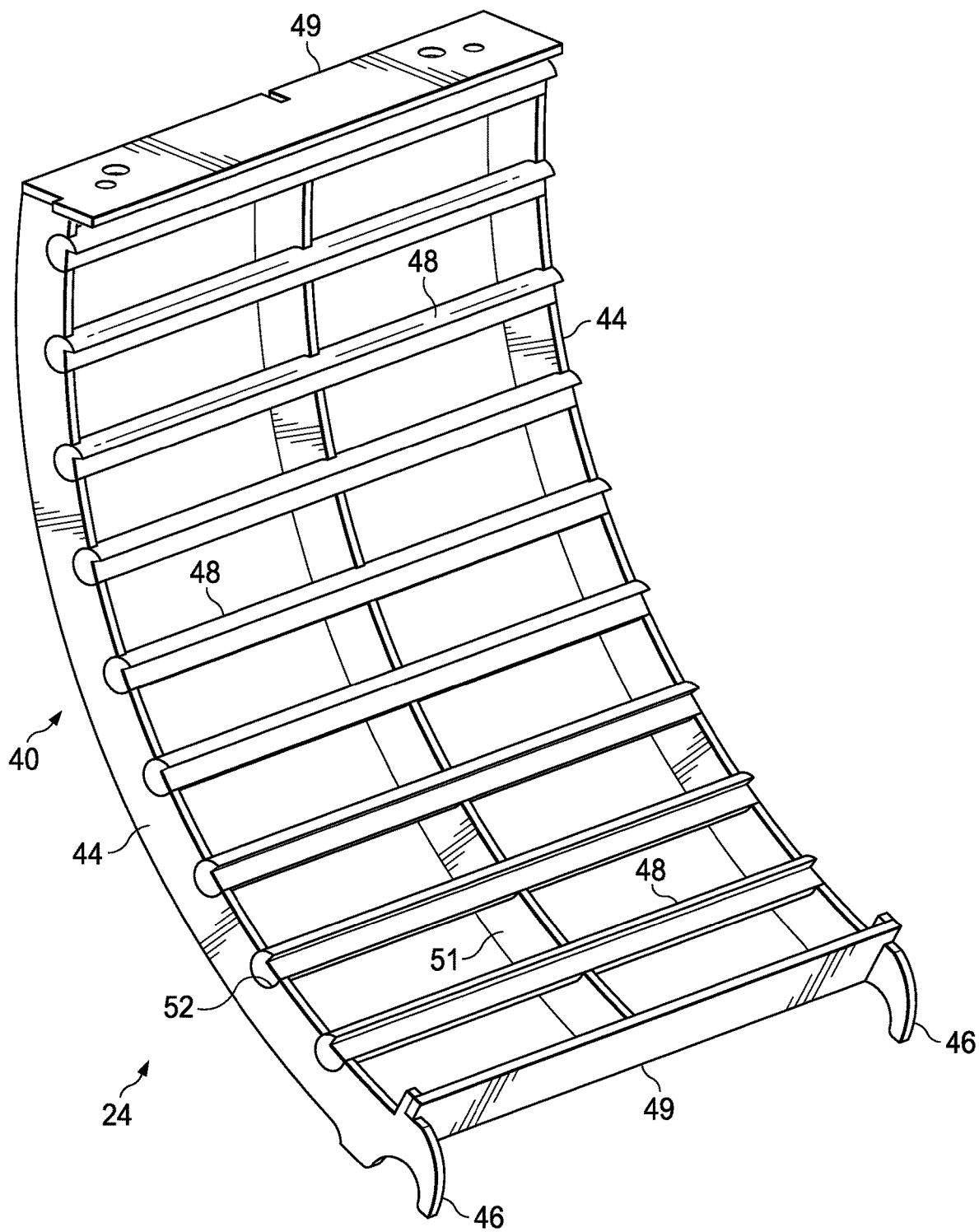
FIG. 3B is a partially cut away view of one of the threshing concave grate assemblies of FIG. 3A.

Each of the depicted conventional threshing concave grates 140 include a pair of arcuate, elongated and laterally spaced apart side rails 144 oriented generally transverse to the axis of the rotor 20 (FIG. 2). One end of each side rail 144 has a hook element 146 used to mount the threshing concave grate 140 on an axial bar (not shown) used to move the threshing concave grate 140 toward or away from the rotor 20 (FIG. 2). A plurality of axial bars 148 span the side rails 144. End plates 149 are preferably affixed between ends of the side rails 144. A middle support rail 151 is typically positioned between and parallel to the side rails 144 and supports the axial bars 148.

The axial bars 148 typically have outwardly projecting overhangs at their opposite ends that overlay upper edges of the side rails 144 and are operable to bear against the same when grate 140 is installed. Preferably, the overhangs are received in notches 152 (FIG. 5B) in the upper edges of side rails 144 and welded to the side rails 144. The overhangs also provide a substantially continuous surface when multiple grate assemblies 24, 26 (FIG. 1) are installed side-by-side in the harvester 10 (FIG. 1). While the axial bars 148 shown in FIGS. 4A and B are depicted as having a round or partially round cross section, it is understood that the axial bars 148 can also have a completely round, notched, oval, rectangular or polygonal cross-section.

A first embodiment of the cover plate assembly 100 is depicted in FIG. 4A. The cover plate assembly 100 comprises an elongated plate body 102 dimensioned to be positioned between two parallel arcuate rails (e.g., arcuate side rail 144 and middle support rail 151) of a threshing concave grate 140. The cover plate assembly 100 is designed to be configured in a curved supinated position against the plurality of axial bars 148 on the exterior of the threshing concave grate 140.

The opposing ends of the elongated plate body 102 of the cover plate assembly 100 are secured to the axial bars by means of clasp elements 104, 106 formed in the opposing ends of the cover plate assembly 100. The clasp elements 104, 106 have a dimensional shape that is complementary to the cross-sectional shape of the axial bars 148, such that they can be easily and quickly attached from the exterior side of the threshing concave grate 140 and slidably locked in place by a simple tug along the longitudinal axis of the cover plate assembly 100. Both clasp elements 104, 106 extend from or are configured on the interior facing surface 102a of the elongated body 102.

Figure 5A:
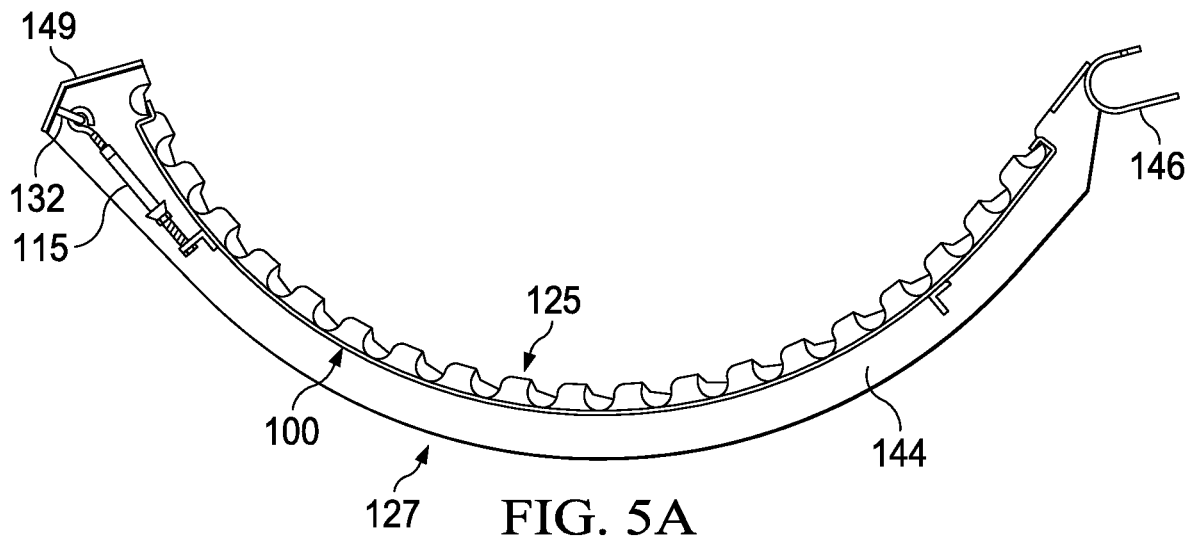
FIG. 5A is a partially cut away view of a threshing concave grate incorporating principles of the cover plate assembly of the present invention.
Figure 5B:
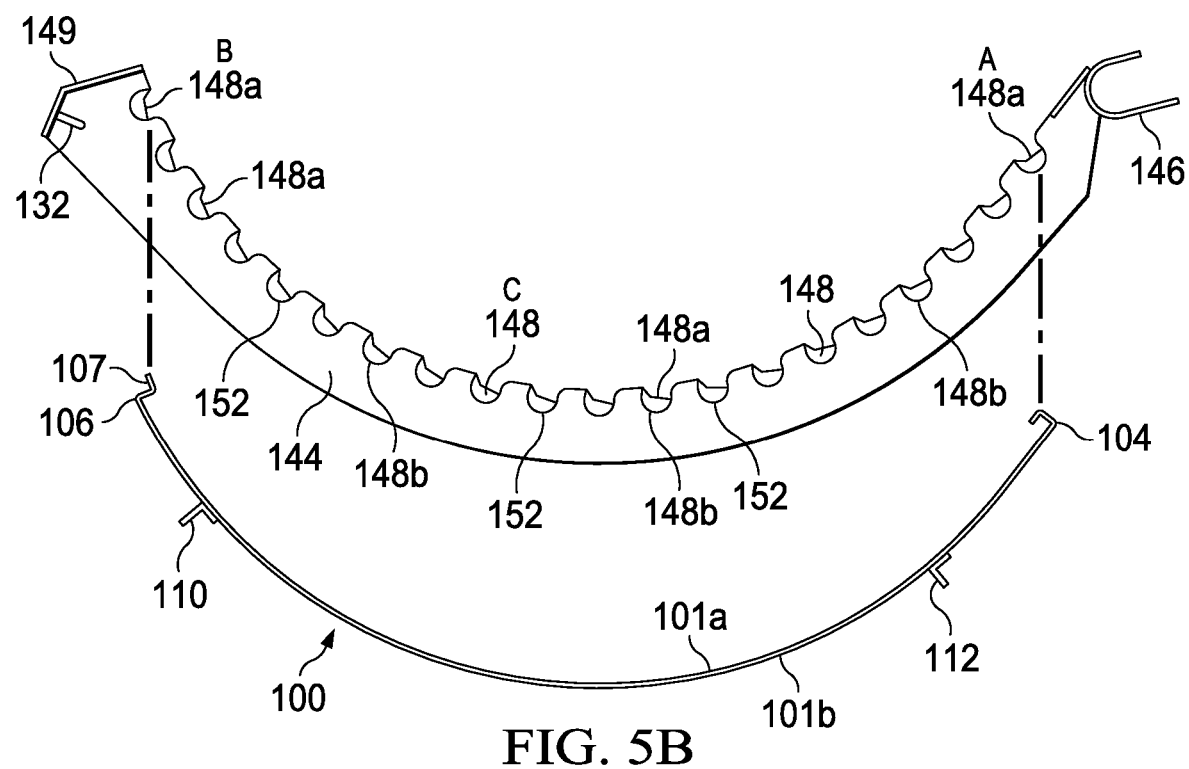
FIG. 5B is an exploded view of the cover plate assembly of the present invention shown in FIG. 5A.
Figure 5C:
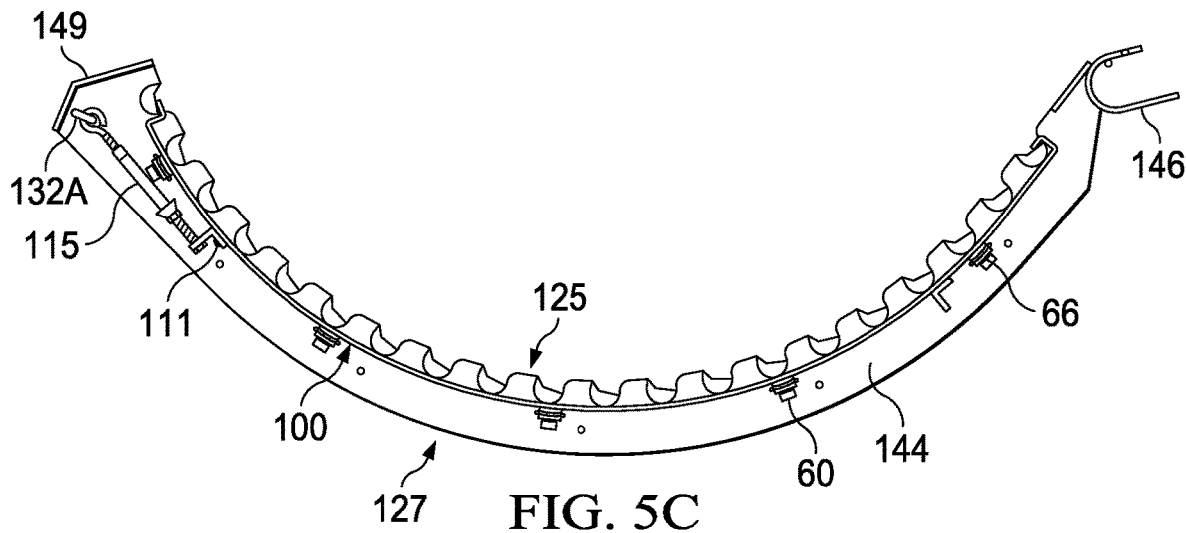
FIG. 5C is a partially cut away view of a threshing concave grate incorporating principles of an alternative embodiment of the cover plate assembly of the present invention.
Figure 7A:
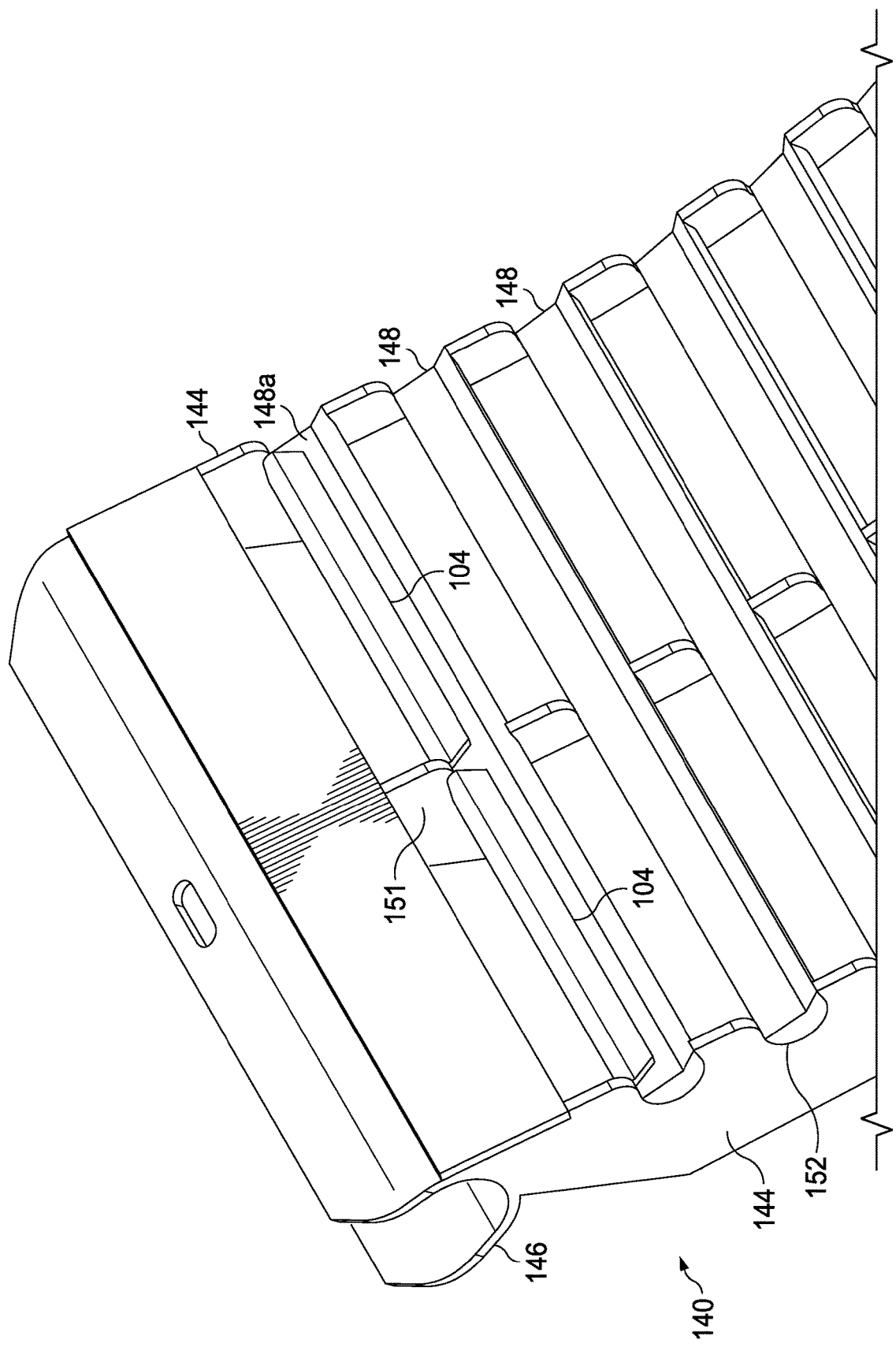
FIG. 7A is an enlarged isometric view of an embodiment of the first or front end of the cover plate assembly of the present invention.

For example, as shown in FIGS. 5B and 7A, the cover plate assembly 100 includes a U-shaped clasp element 104 formed in the first or front end of the elongated plate body 102. The complementary shape of the U-shaped clasp element 104 enables it to be inserted from the exterior side of the threshing concave grate 140 and firmly hook on and grasp the interior or top surface of an axial bar 148a when the cover plate assembly 100 is moved or rotated towards an anchor device (i.e., to the left, as depicted in FIG. 5B) installed on the interior surface of the end plate 149 of the threshing concave grate 140.

Figure 7B:
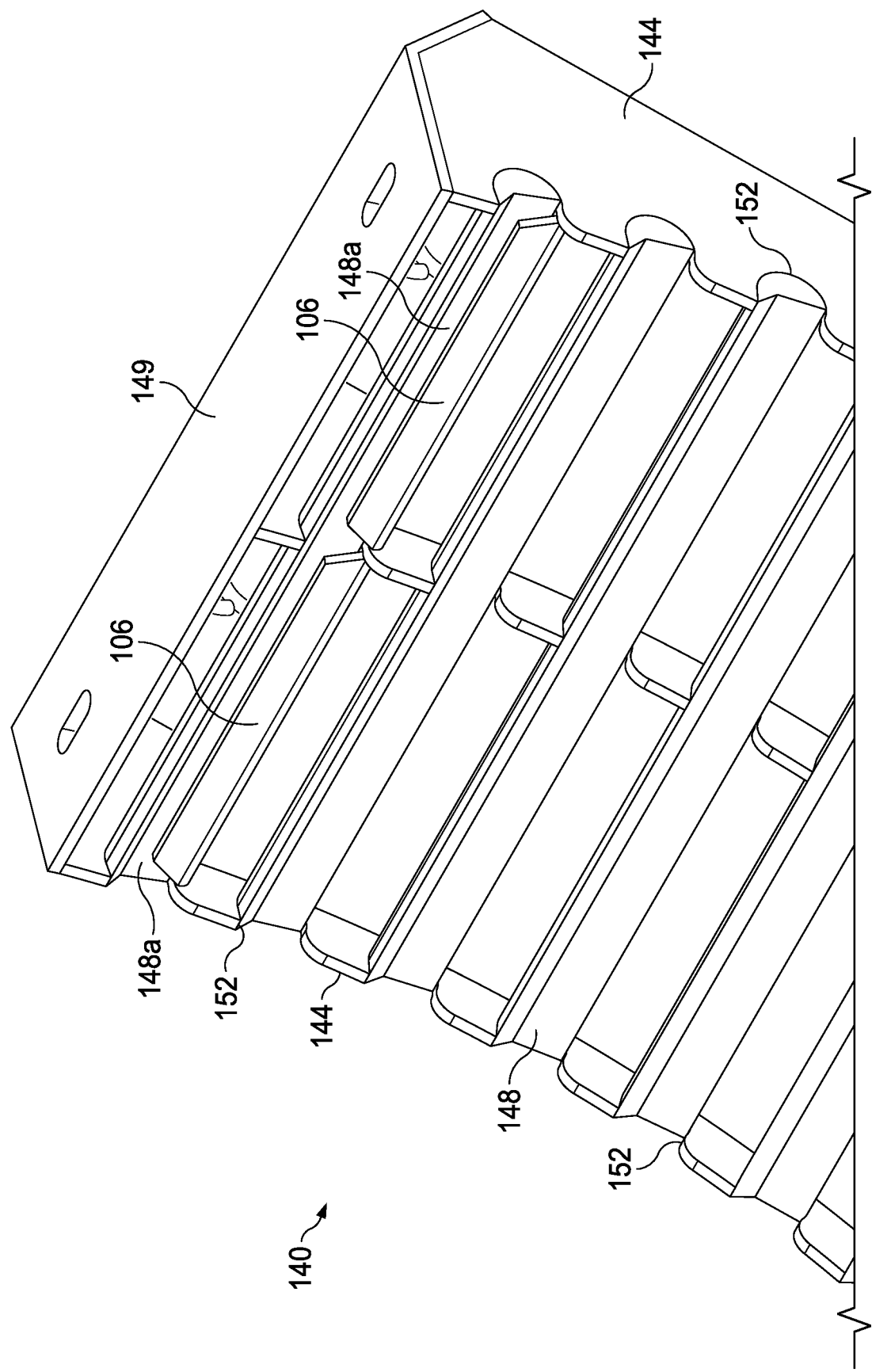
FIG. 7B is an enlarged isometric view of an embodiment of the second or back end of the cover plate assembly of the present invention.

Similarly, as shown in FIGS. 5B and 7B, the cover plate assembly 100 further includes an inverted L-shaped clasp element 106 formed in the second or back end of the elongated plate body 102. The shape of the inverted L-shaped clasp element 106 enables it to also be inserted from the exterior side of the threshing concave grate 140 so that a ledge or surface 107 engages the top surface of another axial bar 148a' when the cover plate assembly 100 assembly is moved or rotated towards an anchor device (i.e., to the left, as depicted in FIG. 5B) installed on the interior surface of the end plate 149 of the threshing concave grate 140.

Preferably, the cover plate assembly 100 is configured so that the clasp elements 104, 106 simultaneously engage their respective axial bars 148 when the cover plate assembly 100 is rotated or moved into its first embodiment of the cover plate assembly 100 is depicted locked position. The cover plate assembly 100 may also include one or more accessory brackets 112 attached to the exterior-facing side 102b of the cover plate body 102 to assist the user in properly positioning and initially securing of the cover plate assembly 100 to a threshing concave grate 140.

The cover plate assembly 100 further includes a latching mechanism 115 that maintains the lateral position of the cover plate assembly 100 so that the clasp elements 104, 106 stay locked in position about their respective axial bars 148. For example, as depicted in FIGS. 4A and 5A, in a preferred embodiment the latching mechanism 115 comprises a turn-buckle tension device configured between an anchor device 132 secured to an end plate 149 of the threshing concave grate 140 and an anchor bracket 110 attached to the exterior-facing side 101b of the cover plate body 102. In an alternative embodiment, the latching mechanism 115 comprises a conventional tension draw latch assembly. Indeed, one skilled in the art will understand that a wide variety of latching mechanisms can be employed to apply a tension force between the anchor bracket 110 attached to the elongated body 102 and the anchor device 132 secured to an end plate 149 of the threshing concave grate 144.

With reference now to FIGS. 4B, 5C-D and 6C-D, in another preferred embodiment, the latching mechanism 115 may comprise a turn-buckle tension device configured between an anchor device 132A secured to a side rail 144 of the concave grate assembly 140 and an anchor bracket 110 attached to the exterior-facing side 101b of the cover plate body 102. As shown in FIG. 4B, the anchor device 132B may alternatively comprise a bar attached to and extending between the opposing side rails 144 of the concave grate assembly 140. The anchor bracket 110 may be rigidly attached (e.g., welded) to the exterior-facing side 101b of the cover plate body 102. Alternatively, the anchor bracket 110 may pivotally attached to the exterior-facing side 101b of the cover plate body 102 by means of a pivoting rivet assembly 111. The pivoting rivet assembly 111 enables an anchor bracket 110 to be properly angled and configured for either an end mounted anchor device 132 or a side-rail mounted anchor device 132B.

With reference again to FIGS. 4B, 5C-D and 6C-D, in yet another alternative embodiment, the cover plate 100 of the present invention may include one or more side latching mechanisms 60 that maintain the lateral position of the cover plate 100 within the side rails 144 so that the hooking clasp elements 104, 106 stay engaged about their respective axial bars 148. The side latching mechanisms 60 may be used as an alternative to, or in addition to, the previously disclosed end latching devices (e.g., 110, 115, 132). For example, as shown in FIG. 4B in a preferred embodiment, the side latching mechanism 60 may comprise at least one sliding bolt latch mechanism 62 attached to the cover plate 100 and configured to engage a corresponding hole 63 drilled in the side rail 144 of the concave grate assembly 140. As depicted, the sliding bolt latch mechanism may include a biasing element (e.g., spring or cam) to bias the sliding bolt in the locked or engaged position. In another embodiment, the side latching mechanism 60 may comprise at least one tension draw latch assembly 66 configured to engage a latch catch 67 attached to or formed into the side rail 144 of the concave grate assembly 140. Indeed, one skilled in the art will understand that a wide variety of side latching mechanisms can be employed to secure the configuration of the cover plate body 102 on the concave grate assembly 140.

When properly installed and secured in a locked position, the elongated body 102 of the cover plate assembly 100 is pulled tightly against the back of the exterior side of the threshing concave grate 140 significantly changing airflow characteristics through the openings in the threshing concave grate 140 and consequently creating a cushion of air between threshing concave grate 140 and the rotor/cylinder of the combine harvester. This cushion of air regulates the rate at which the crop material moves through the concave section. By restricting the airflow through a threshing concave grate, the time in which the crop is in the threshing section of the concave is prolonged, which facilitates more material-on-material rubbing contact, thereby greatly improving threshing and separation of grain from chaff for hard-to-thresh crop types and varieties.

Figure 5D:
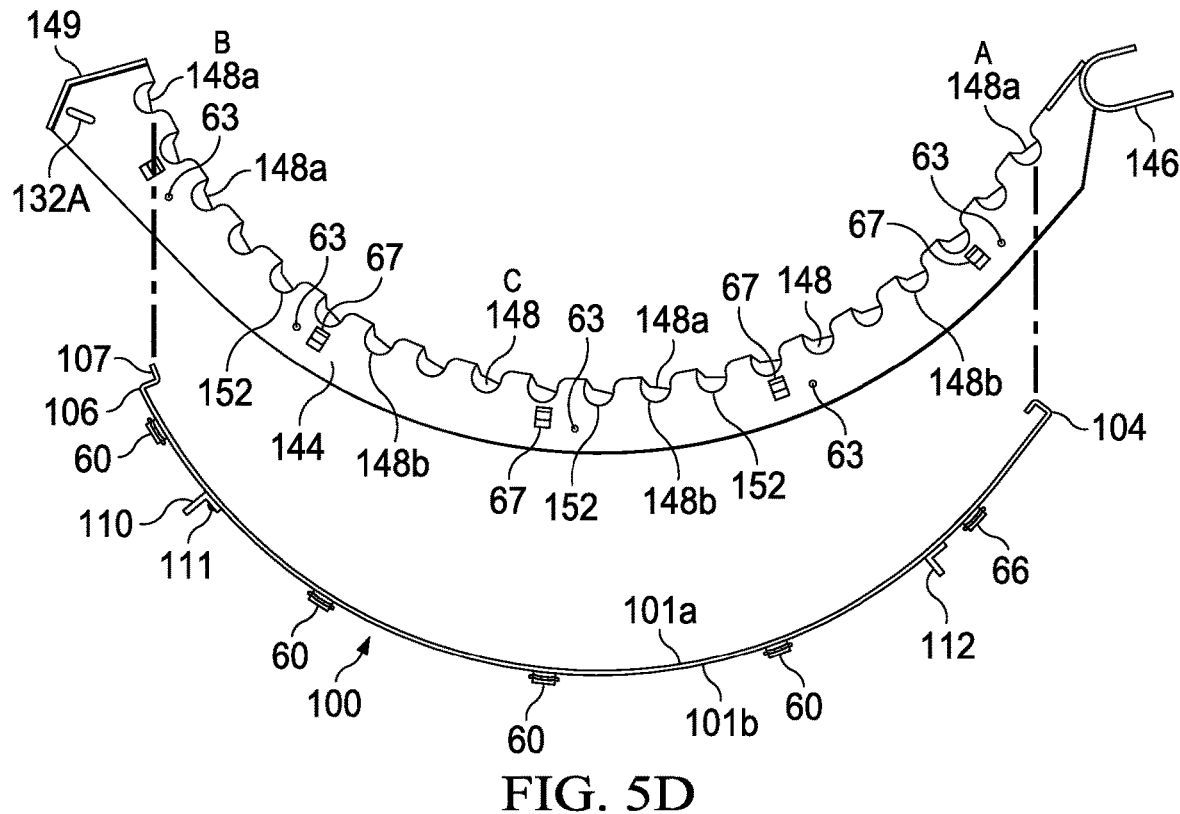
FIG. 5D is an exploded view of the alternative embodiment of the cover plate assembly of the present invention shown in FIG. 5C.
Figure 6A:
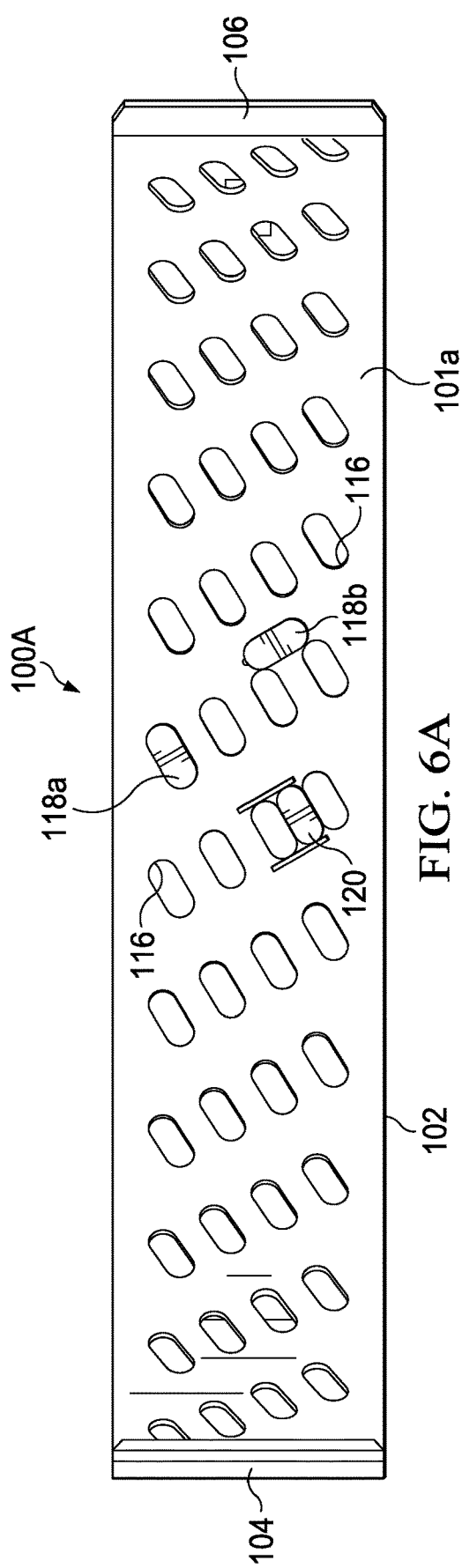
FIG. 6A is a top plan view of the interior side of the cover plate assembly of the present invention shown in FIG. 5A.
Figure 6B:
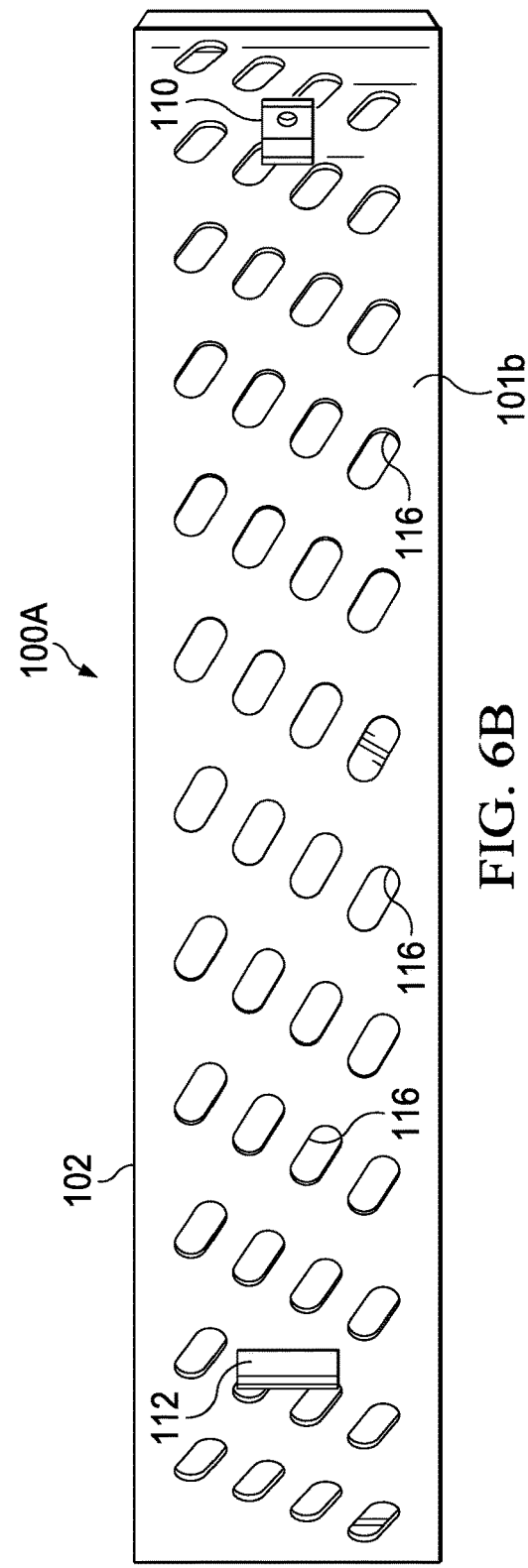
FIG. 6B is a top plan view of the exterior side of the cover plate assembly of the present invention shown in FIG. 5A.
Figure 6C:
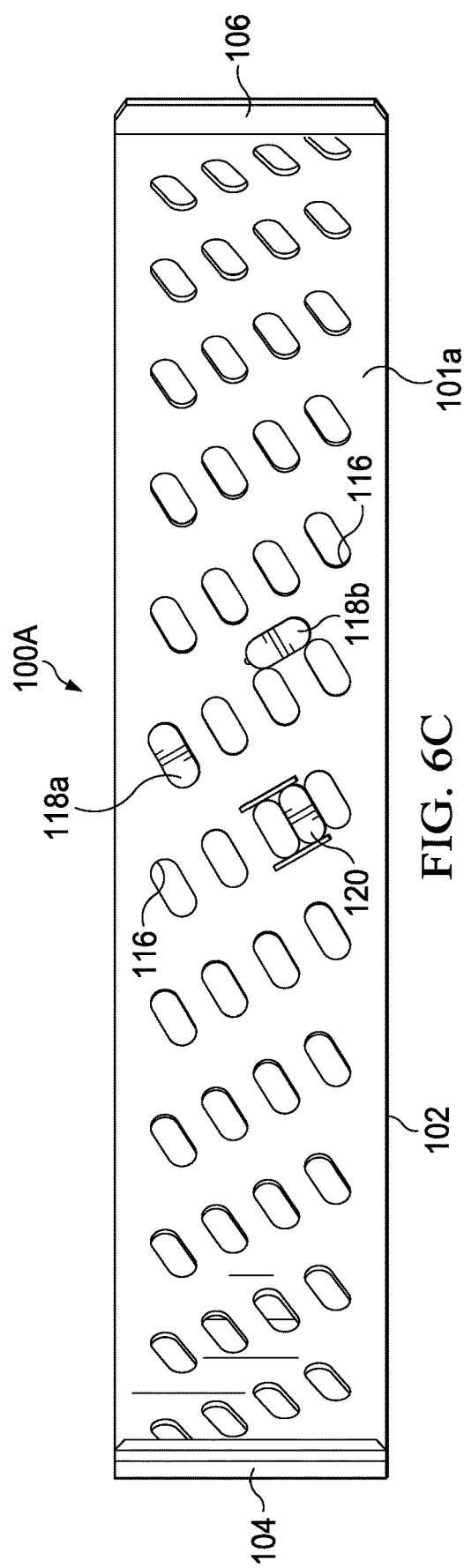
FIG. 6C is a top plan view of the interior side of the alternative embodiment of the cover plate assembly of the present invention shown in FIG. 5C.
Figure 6D:
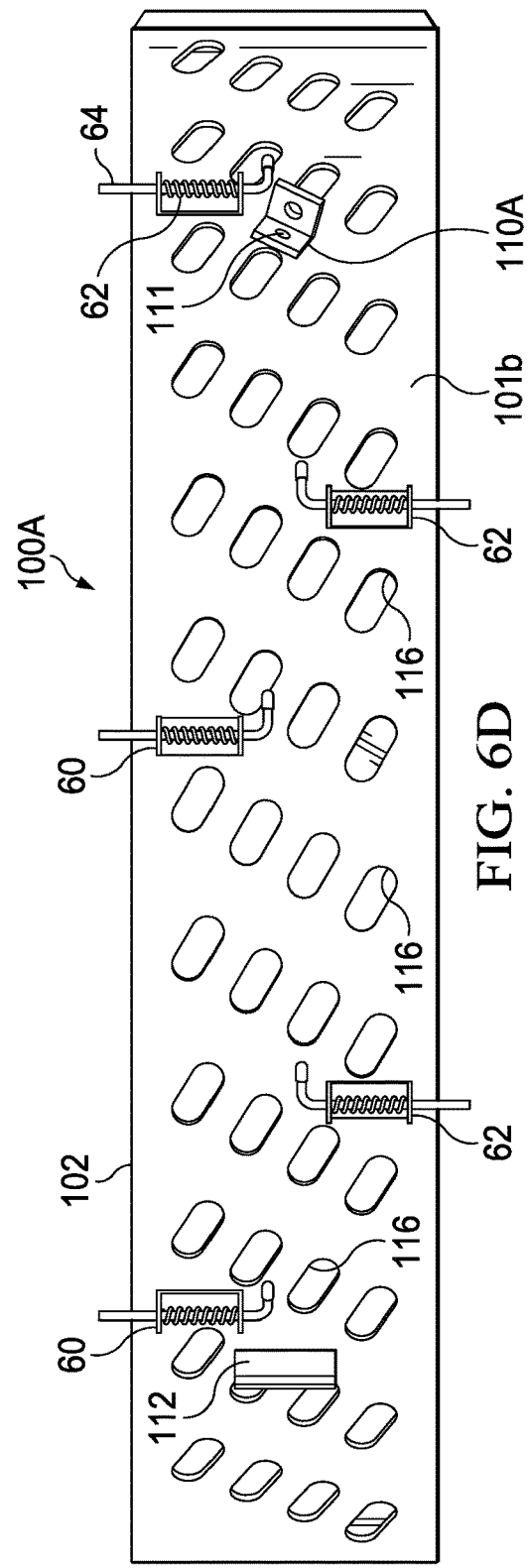
FIG. 6D is a top plan view of the exterior side of the alternative embodiment of the cover plate assembly of the present invention shown in FIG. 5C.

The embodiment of the cover plate assembly 100 shown in the Figures is preferably constructed of a single plate of high strength material such as metal, high strength plastics or composite fabric material. While a preferred embodiment of the cover plate assembly 100 is constructed of steel plating that is permanently bent in an arcuate shape matching the exterior arcuate shape of a threshing concave grate 140 as shown in FIGS. 5B and 5D, it is understood that the elongated body of the cover plate assembly may be constructed of flexible, high strength materials such as stainless steel or woven composite materials. Alternatively, the elongated body can also be cast into a predetermined arcuate shape matching the exterior arcuate shape of a threshing concave grate 140. In addition, while a preferred embodiment of the cover plate assembly features an elongated body 102 having a unitary construction, wherein the clasp elements 104, 106 on opposing ends of the assembly 100 are simply formed into the ends of the elongated body 102, it is understood that the elongated body 102, and the two clasp elements 104, 106 may comprise individual parts of a composite construction wherein the elongated body and the clasp elements are constructed of different materials. For example, the elongated body 102 may be constructed of a woven, high-strength, plastic material, while the clasp elements 104, 106 may be constructed of metal that are attached to opposing ends of the elongated body.

Additionally, the material used to construct the elongated body of the cover plate assembly may also have a wide variance of porosity and permeability. This may be accomplished by a variety of techniques. While a preferred embodiment of the cover plate assembly is constructed of solid plate material, other embodiments include a plurality of apertures or holes formed in the elongated body. For example, as shown in FIGS. 4 and 6, a second embodiment of the cover plate assembly 100A further includes a plurality of apertures or holes 116 formed in the rectangular body 102 of the cover plate assembly 100A. The holes 116 may be configured randomly or in a geometric pattern as shown in FIGS. 6A-D. In addition to increasing the airflow through the cover plate assembly 100A, the holes 116 provide additional exit passages for threshed grain to be unloaded from the rotor/cylinder and captured so that the separation grate is not overloaded. The plurality of apertures or holes 116 may further include means for adjusting the shape or size of the aperture 116. For example, in one embodiment, such adjusting means may simply comprise a plug device 118 for plugging the aperture. The plug device 118 can comprise a screw-in or pop-in plug 118*a* or a flapper-like cover 118*b*. Alternatively, the adjusting means may comprise a sliding panel mechanism incorporated into the elongated body 102 that features a movable panel section 120 which could be configured to close or partially close a hole or aperture 106.

The material that the elongated body 102 is constructed of may also have a natural porosity and permeability. For example, the elongated body of the cover plate may be constructed of a metal mesh or composite material having organic porosity and permeability characteristics.

The longitudinal length of the elongated body 102 of the cover plate assembly 100 may also be varied to change the characteristics of the threshing concave grate. While a preferred embodiment of the invention includes an elongated body 102 having a longitudinal length suitably dimensioned to substantially cover the entire lateral circumference of a threshing concave grate, other embodiments may include elongated bodies having lesser longitudinal lengths so as to cover only a portion of the lateral circumference of a threshing concave grate. For example, with reference to FIG. 5B, while a preferred embodiment of the cover plate assembly 100 of the present is dimensioned to substantially cover the entire lateral circumference of a threshing concave grate (i.e., from axial bar 148*a* (A) to axial bar 148*a*' (B), other embodiments of the cover plate assembly of the present invention may include elongated bodies having lesser longitudinal lengths so as to cover only a portion of the lateral circumference of a threshing concave grate (i.e., from axial bar 148*a* (A) to axial bar 148*a*" (C)).

Figure 8A:
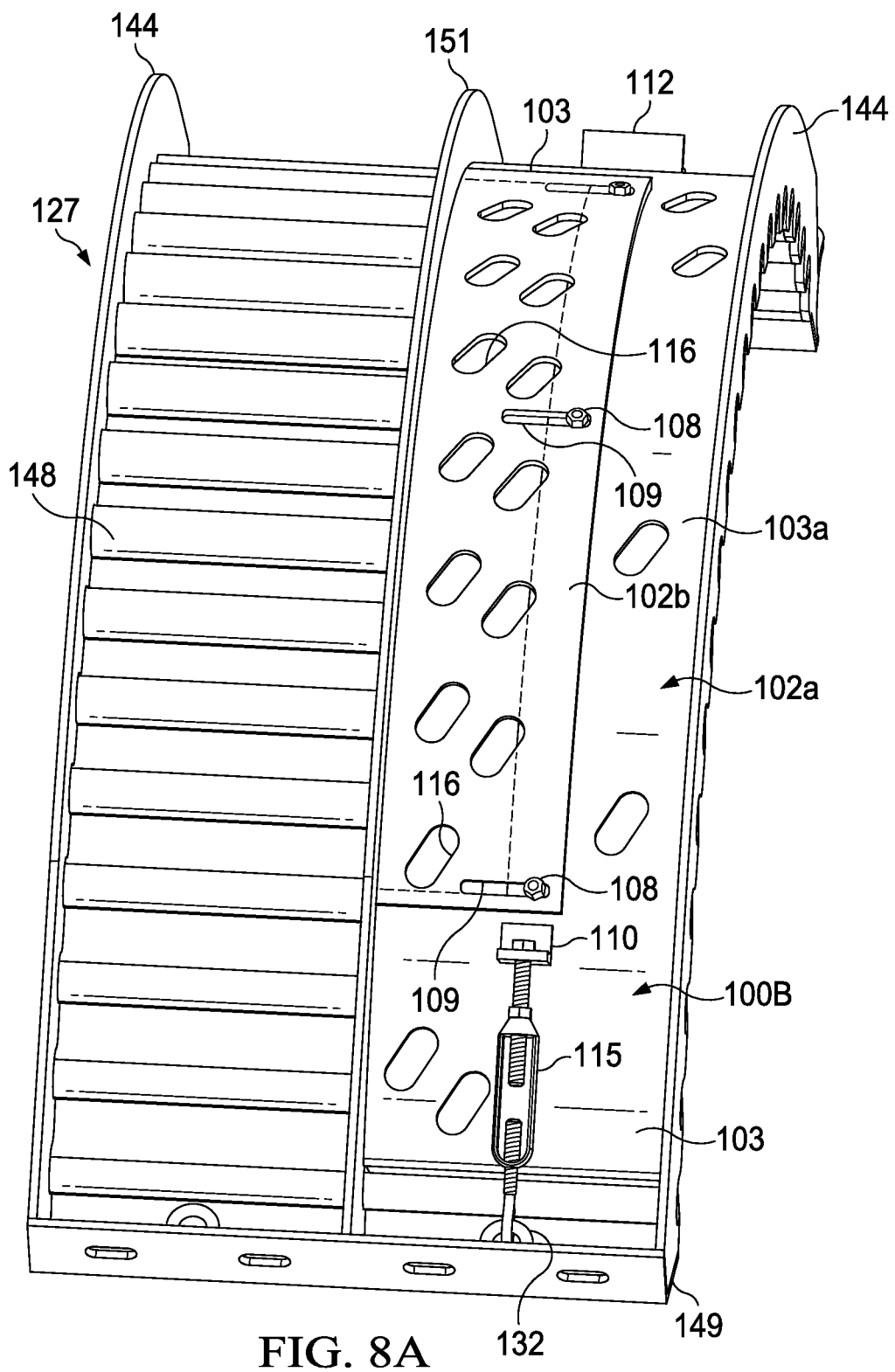
FIG. 8A is a threshing concave grate incorporating an alternative embodiment of the cover plate assembly of the present invention.
Figure 8B:
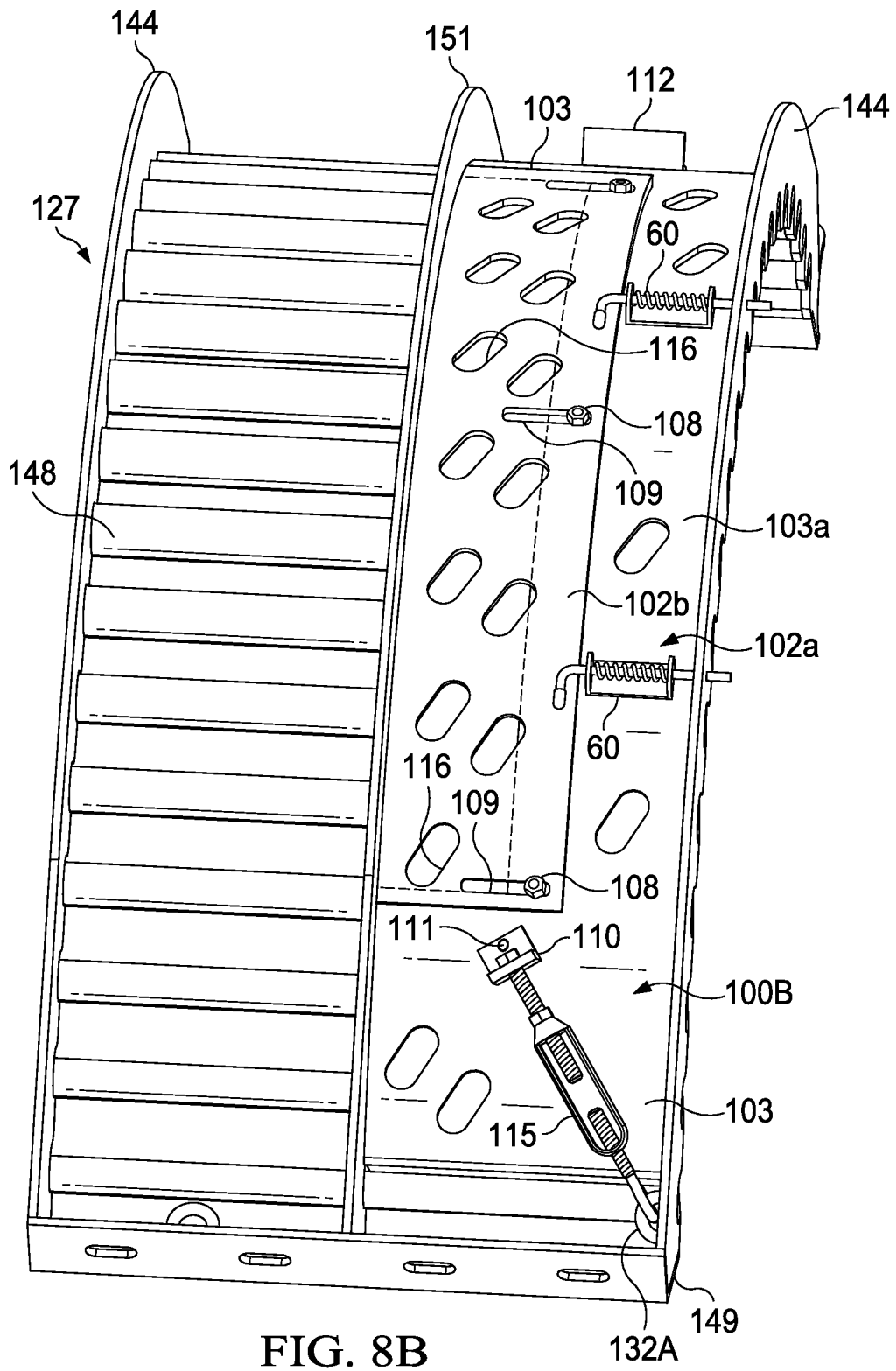
FIG. 8B is a threshing concave grate incorporating another alternative embodiment of the cover plate assembly of the present invention.

With reference now to FIGS. 8A-B another preferred embodiment of the cover plate assembly 100B of the present invention is shown. The cover plate assembly 100B features an elongated body having an adjustable width. The cover plate assembly 100B is dimensioned to fit within a section of a threshing concave grate 140 configured between two parallel arcuate rails (e.g., arcuate side rail 144 and middle support rail 151). The elongated body of the cover plate assembly 100B is comprised of two elongated plates 102*a*, 102*b*, which are attached in a slidably adjustable configuration for adjusting the lateral dimension or width of the cover plate assembly 100B. In a preferred embodiment, the two elongated plates 102*a*, 102*b* are attached to each other by means of a plurality of bolts 108 attached to a first or main plate 102*a* and captured in slots 109 formed in a second or accessory plate 102*b*. The main plate 102*a* features panel sections 103 configured on each of the opposing ends which span the entire section width of the threshing concave grate 140 while the width of the middle section 103*a* of the main plate 102*a* is less than the full section width of the of the threshing concave grate 140. The second or accessory plate 102*b* is positioned in a slidable configuration with the first or main plate 102*a* so that the opening in the middle section 103*a* of the main plate 102*a* may be adjusted as desired. As with previous embodiments, the elongated plates 102*a*, 102*b* of the cover plate assembly 100B may include holes or apertures 116 to further adjust the flow characteristics of the adjustable cover plate assembly 100B.

The cover plate assembly 100B further includes a latching mechanism 115 that maintains the lateral position of the cover plate assembly 100B so that the clasp elements 104, 106 stay locked in position about their respective axial bars 148. For example, as depicted in FIG. 8A, the latching mechanism 115 may comprise a turn-buckle tension device configured between an anchor bracket 110 attached to the exterior-facing side of the cover plate main body 102*a* and an anchor device 132 secured to an end plate 149 of the concave grate 140. In an alternative embodiment, the end latching mechanism 115 may comprise a conventional tension draw latch assembly. Indeed, one skilled in the art will understand that a wide variety of latching mechanisms can be employed to apply a tension force between the anchor bracket 110 attached to the elongated body 102 and the anchor device 132 secured to an end plate 149 or side rail 144 of the threshing concave grate 144.

As shown in FIG. 8B, the latching mechanism 115 may also comprise a turn-buckle tension device configured between an anchor device 132A secured to a side rail 144 of the concave grate assembly 140 and an anchor bracket 110 attached to the exterior-facing side of the main cover plate body 102*a*. As previously disclosed, the anchor device 132B may alternatively comprise a bar extending between the opposing side rails 144 of the concave grate assembly 140. The anchor bracket 110 attached to the main cover plate body 102*a* may be rigidly attached (e.g., welded) to the exterior-facing side of the main cover plate body 102*a*. Alternatively, the anchor bracket 110 may pivotally attached to the exterior-facing side of the main cover plate body 102*a* by means of a pivoting rivet assembly 111. The pivoting rivet assembly 111 enables the anchor bracket 110 to be selectively angled and configured for either an end mounted anchor device 132 or a side-rail mounted anchor device 132B.

The cover plate assembly 100B may also or alternatively include one or more side latching mechanisms 60 that maintain the lateral position of the main cover plate assembly 100B within the side rails 144 so that the hooking clasp elements 104, 106 stay engaged about their respective axial bars 148. As mentioned previously, the side latching mechanisms 60 may be used as an alternative to, or in addition to, the previously disclosed end latching devices (e.g., 110, 115, 132). For example, as shown in FIG. 8B in a preferred embodiment, the side latching mechanism 60 may comprise at least one sliding bolt latch mechanism 62 attached to the main cover plate 100b and configured to engage a corresponding hole drilled in the side rail 144 of the concave grate assembly 140. As depicted, the sliding bolt latch mechanism may include a biasing element (e.g., spring or cam) to bias the sliding bolt in the locked or engaged position. In another embodiment, the side latching mechanism 60 may comprise at least one tension draw latch assembly 66 (see FIG. 4B) configured to engage a latch catch 67 attached to or formed into the side rail 144 of the concave grate assembly 140. Indeed, one skilled in the art will understand that a wide variety of side latching mechanisms can be employed to secure the configuration of the main cover plate body 102b on the concave grate assembly 140.

The cover plate assembly of the present invention improves the threshing capability of the rasp bar threshing cylinder while simultaneously permitting the capture of additional threshed grain. Moreover, the methods for using the cover plate assembly of the present invention enables a single set of threshing concave grate assemblies to better harvest a wider variety of crop types.

The cover plate assembly of the present invention eliminates the need to change threshing concave grates when harvesting harder to thresh crops and allows the operator to simply attach cover plate assemblies to the backside (i.e., exterior) of the threshing concave grates. A plurality of cover plate assemblies of the present invention can be readily added to or removed from a combine harvester depending on how difficult the crop is to thresh. In general, crop material that is more difficult to thresh requires more cover plate assemblies so that the crop material is held in the threshing section longer. By adding cover plate assemblies of the present invention to a combine harvester, the operator can adjust the rate at which the crop material moves through the threshing concaves, facilitating more crop material rubbing on crop material, and thereby providing superior threshing capability with less grain damage. In addition, the strategically placed and engineered holes or apertures 116 in the cover plate assembly allow for grain to be captured as it is threshed and retained by the combine. Moreover, it prevents the separation grate assemblies, whose purpose is to unload threshed grain, from becoming overloaded causing grain to be lost out the back of the combine.

Methods employing the cover plate assembly of the present invention also enhance the harvesting effectiveness of combine harvesters when harvesting high-moisture crops. For example, high-moisture corn kernels are harder to separate from the cob, which necessitates the need for the crop material to stay in the threshing section longer. The cover plate assembly can be used to adjust the flow rate of the threshing concave, keeping the crop material (i.e., corn in this particular instance) in the threshing section for a longer time, thereby enabling the threshing section to better separate grain from chaff.

Methods employing the cover plate assembly also enhance the harvesting effectiveness of combine harvesters when harvesting delicate, dry, or easy to crack and/or split crops. For example, edible beans are delicate and are known to crack and split easily. The addition of the cover plate assembly to a threshing concave grate creates a cushion of air which provides for a softer thresh by means of more crop material rubbing on crop material. With the installation the cover plate assembly on the threshing concave grates, the rotor speed can be decreased preventing needless damage to the crop. The air cushion created by the cover plate assembly enables more material-on-material threshing. The clearance or distance between the concave and rotor can also be increased which reduces compressing the crop against the concave thereby decreasing the mechanical damage to the crop. Furthermore, increasing the clearance/distance between the concave and rotor also increases the volume of crop material that can be processed, thereby allowing the operator to increase the ground speed of the agricultural thresher. By increasing the volume of crop material being processed, the rotor is full of more crop material, consequently resulting in more material-on-material threshing and less grain damage (e.g., cracks and splits).

Methods employing the cover plate assembly of the present invention also enhance the harvesting effectiveness of combine harvesters when harvesting crops that have a lot of small leafy, foreign material around seed. Material such as this often ends up intermixed with the harvested seed. Material other than grain (MOG), results in dockage/discount on price per unit the farmer receives when selling the crop. For example, when harvesting sunflower seeds, the seeds thresh easily but there is a lot of leafs, pedals and other foreign material surrounding the seeds. When sunflowers are harvested much of this MOG falls down through the threshing concave grates and oftentimes ends up in the grain tank with the sunflower seeds. The cover plate assembly of the present invention can be used as a course filter to reduce or close the large gaps in the threshing concave grates filtering out a significant portion of the MOG. However, the apertures in the cover plate assemblies will allow the small sunflower seed to still fall through and end up in the tank.

The present invention addresses and overcomes the aforementioned limitations of the prior art by providing a cover plate assembly that restricts the rate of speed at which the crop moves through the threshing concave section, so that the crop is in the threshing concave section which improves the separation of grain and chaff. This proves especially beneficial for hard-to-thresh, delicate and high-moisture crops and allows one set of concaves to be more versatile in all crops. From one crop to the next, cover plate assembly can easily and quickly be added or removed depending on how difficult the crop is to thresh. The cushion of air that is created by the cover plate assembly allows for more material to be processed through a rotor, facilitating more material-on-material rubbing, and thereby producing a cleaner grain sample with less mechanical damage.

It will now be evident to those skilled in the art that there has been described herein an improved method and apparatus for readily adjusting the flow characteristics of the threshing concave grates on rasp bar threshing cylinder system. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A cover plate assembly comprising:
    an elongated body having a plurality of holes formed therethrough, said elongated body dimensioned to fit between two parallel arcuate side rails on the exterior of a concave grate of a combine harvester; said elongated body having two opposing ends, each end having a clasp element formed therein for grasping onto separate axial bars spanning the parallel arcuate rails and locking said body in a supinated position against the exterior of said concave grate; and
    a latching mechanism for maintaining the position of said elongated body relative to said concave grate so that each of said clasp elements maintain its grasp on its respective axial bar, wherein said latching mechanism comprises an anchor bracket attached to an exterior-facing side of said elongated body, an anchor device secured one of said side rails of said concave grate, and a mechanism for inducing a tension force between the anchor bracket and the anchor device.

2. The cover plate assembly of claim 1, wherein said clasp elements comprise a first clasp element having a cross-sectional shape that is U-shaped and second clasp element having a cross-sectional shape that is inverted L-shaped.

3. The cover plate assembly of claim 1, wherein the width of said elongated body is adjustable.

4. The cover plate assembly of claim 1, wherein said plurality of holes are randomly configured on the elongated body.

5. The cover plate assembly of claim 1, wherein said plurality of holes are configured in a geometric pattern on the elongated body.

6. The cover plate assembly of claim 1, further comprising at least one plug device inserted into one of said plurality of holes formed through the elongated body.

7. The cover plate assembly of claim 6, wherein said plug device comprises a screw-in plug device or a pop-in plug device.

8. The cover plate assembly of claim 1, further comprising a mechanism for adjusting the shape of at least one of said plurality of holes.

9. The cover plate assembly of claim 8, wherein said adjusting mechanism comprises a movable panel section.

10. The cover plate assembly of claim 8, wherein said adjusting mechanism comprises a pivotal flapper-like cover.

11. A cover plate assembly comprising:
    an elongated body having a plurality of holes formed therethrough, said elongated body dimensioned to fit between two parallel arcuate side rails on the exterior of a concave grate of a combine harvester; said elongated body having two opposing ends, each end having a clasp element formed therein for grasping onto separate axial bars spanning the parallel arcuate rails and locking said body in a supinated position against the exterior of said concave grate; and
    a latching mechanism for maintaining the position of said elongated body relative to said concave grate so that each of said clasp elements maintain its grasp on its respective axial bar, wherein said latching mechanism comprises at least one side latching mechanism attached to an exterior-facing side of said elongated body for securing said elongated body to at least one of said side rails.

12. The cover plate assembly of claim 11, wherein said clasp elements comprise a first clasp element having a cross-sectional shape that is U-shaped and second clasp element having a cross-sectional shape that is inverted L-shaped.

13. The cover plate assembly of claim 11, wherein the width of said elongated body is adjustable.

14. The cover plate assembly of claim 11, wherein said plurality of holes are randomly configured on the elongated body.

15. The cover plate assembly of claim 11, wherein said plurality of holes are configured in a geometric pattern on the elongated body.

16. The cover plate assembly of claim 11, further comprising at least one plug device inserted into one of said plurality of holes formed through the elongated body.

17. The cover plate assembly of claim 16, wherein said plug device comprises a screw-in plug device or a pop-in plug device.

18. The cover plate assembly of claim 11, further comprising a mechanism for adjusting the size of at least one of said plurality of holes.

19. The cover plate assembly of claim 18, wherein said adjusting mechanism comprises a movable panel section.

20. The cover plate assembly of claim 18, wherein said adjusting mechanism comprises a pivotal flapper-like cover.

* * * * *